United States Patent
Zheng

(10) Patent No.: US 11,196,576 B2
(45) Date of Patent: Dec. 7, 2021

(54) METHOD FOR INDICATING MULTICAST FORWARDING ENTRY AND DEVICE

(71) Applicant: Huawei Technologies Co., Ltd., Shenzhen (CN)

(72) Inventor: Ruobin Zheng, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 106 days.

(21) Appl. No.: 15/332,867

(22) Filed: Oct. 24, 2016

(65) Prior Publication Data
US 2017/0041157 A1 Feb. 9, 2017

Related U.S. Application Data

(63) Continuation of application No. PCT/CN2015/075786, filed on Apr. 2, 2015.

(30) Foreign Application Priority Data

Apr. 24, 2014 (CN) .......................... 201410169740.8

(51) Int. Cl.
*H04L 12/18* (2006.01)
*H04L 12/24* (2006.01)
(Continued)

(52) U.S. Cl.
CPC .......... *H04L 12/18* (2013.01); *H04L 61/2007* (2013.01); *H04L 41/12* (2013.01); *H04L 61/6022* (2013.01); *H04L 69/324* (2013.01)

(58) Field of Classification Search
CPC ..... H04L 12/18; H04L 41/12; H04L 61/2007; H04L 61/6022; H04L 69/324
See application file for complete search history.

(56) References Cited

U.S. PATENT DOCUMENTS 6,707,796 B1   3/2004 Li
2005/0152370 A1*  7/2005 Meehan .............. H04L 12/5601
                                                         370/393
(Continued)

FOREIGN PATENT DOCUMENTS

CN    101150425 A    3/2008
CN    101924701 A    12/2010
(Continued)

OTHER PUBLICATIONS

Aharoni et al., "Restricted Dynamic Steiner Trees for Scalable Multicast in Datagram Networks," IEEE Transactions on Networking, vol. 6, No. 3, pp. 289-297, Institute of Electrical and Electronics Engineers, New York, New York (Jun. 1998).
(Continued)

*Primary Examiner* — Jae Y Lee
*Assistant Examiner* — M Mostazir Rahman
(74) *Attorney, Agent, or Firm* — Leydig, Voit & Mayer, Ltd.

(57) ABSTRACT

Embodiments of the present disclosure provide a method for indicating a multicast forwarding entry and a device. The method includes: receiving a packet from a first node, wherein the packet comprises a multicast control message and an access loop identifier; obtaining, according to a multicast Internet Protocol (IP) address in the multicast control message, a multicast Media Access Control (MAC) address; obtaining an identifier of a first port according to the access loop identifier, wherein the first port is an egress port, on the multicast path, of the first port; sending a first forwarding entry to the first node, wherein a destination address of the first forwarding entry is the multicast MAC address and egress port information of the first forwarding entry is the identifier of the first port.

18 Claims, 6 Drawing Sheets

(51) Int. Cl.
*H04L 29/12* (2006.01)
*H04L 29/08* (2006.01)

(56) References Cited

U.S. PATENT DOCUMENTS

| | | | |
|---|---|---|---|
| 2009/0059935 A1 | 3/2009 | Dec | |
| 2010/0290478 A1* | 11/2010 | Xia | H04L 45/38 370/401 |
| 2012/0182876 A1* | 7/2012 | Miyabe | H04L 12/4625 370/242 |
| 2012/0236864 A1* | 9/2012 | Zheng | H04L 29/12915 370/392 |
| 2014/0140343 A1* | 5/2014 | Onoue | H04L 12/1877 370/390 |
| 2014/0286352 A1* | 9/2014 | Turgeman | H04L 49/90 370/429 |
| 2015/0349970 A1 | 12/2015 | Wang et al. | |

FOREIGN PATENT DOCUMENTS

| | | |
|---|---|---|
| CN | 102088391 A | 6/2011 |
| CN | 102946357 A | 2/2013 |
| CN | 103414644 A | 11/2013 |
| CN | 103430499 A | 12/2013 |
| EP | 2079198 A1 | 7/2009 |
| EP | 2495926 A1 | 9/2012 |

OTHER PUBLICATIONS

"OpenFlow Switch Specification," ONF TS-006, Version 1.3.0, pp. i-105, Open Networking Foundation (Jun. 25, 2012).

* cited by examiner ns of network
METHOD FOR INDICATING MULTICAST FORWARDING ENTRY AND DEVICE

CROSS-REFERENCE TO RELATED APPLICATIONS

This application is a continuation of International Application No. PCT/CN2015/075786, filed on Apr. 2, 2015, which claims priority to Chinese Patent Application No. 201410169740.8, filed on Apr. 24, 2014. The disclosures of the aforementioned applications are hereby incorporated by reference in their entireties.

TECHNICAL FIELD

The present disclosure relates to the field of computer network technologies, and in particular, to a method for indicating a multicast forwarding entry and a device.

BACKGROUND

FIG. 1 is a schematic diagram of a typical scenario of an access network in the prior art. As shown by arrows in FIG. 1, each network node (Node) on a multicast path must support a listening/proxy function of an internet group management protocol (IGMP)/multicast listener discovery protocol (MLD), so as to implement a transmission of an IGMP/MLD message on the multicast path, and generate a corresponding multicast forwarding entry, respectively.

For example, if IGMP/MLD versions of a Node 1 and a Node 2 in FIG. 1 are same, after receiving an IGMP/MLD message forwarded by the Node 1, the Node 2 parses the IGMP/MLD message to obtain a multicast IP address, hereby obtaining a multicast MAC address, and then establishes a correspondence between a port which receives the IGMP/MLD message and the multicast MAC address, that is, generates a multicast forwarding entry which is composed of the port and the multicast MAC address. Only when each node generates a respective multicast forwarding entry during a process of transmitting the IGMP/MLD message, can each node identify its own multicast data packet subsequently and continue to transmit the multicast data packet to a next node through a port recorded in the multicast forwarding entry to implement a data multicast. However, if IGMP/MLD versions are different, not all of nodes on the multicast path can certainly parse the IGMP/MLD message correctly to generate a multicast forwarding entry, so that a multicast fails to be realized. For this reason, an engineering technical personnel generally needs to take into account IGMP/MLD version of each network node when a network node (for example, a digital subscriber line access multiplexer (DSLAM)), an optical network unit (ONU), an optical line termination (OLT), an Ethernet switch, a broadband network gateway (BNG)/a broadband remote access server (BRAS) or the like) is introduced, and perform a large amount of compatibility and matching operation on an access network. Apparently, such manner increases operation and maintenance complexity.

In the prior art, there has not been put forward a convenient solution which may realize that each network node may acquire a multicast forwarding entry when an IGMP/MLD protocol version of each network node is different.

SUMMARY

Embodiments of the present disclosure provide a method for indicating a multicast forwarding entry and a device, so as to resolve a problem of failing to acquire a multicast forwarding entry by each network node caused due to difference of IGMP/MLD protocol versions of network nodes in the prior art.

According to a first aspect, an embodiment of the present disclosure provides a method for indicating a multicast forwarding entry, including:
    receiving a packet from a first node, where the packet includes a multicast control message and an access loop identifier;
    obtaining, according to a multicast Internet Protocol (IP) address in the multicast control message, a multicast Media Access Control (MAC) address;
    obtaining an identifier of a first port according to the access loop identifier, where the first port is an egress port, on the multicast path, of the first port;
    sending a first forwarding entry to the first node, where a destination address of the first forwarding entry is the multicast MAC address and egress port information of the first forwarding entry is the identifier of the first port.

With reference to the first aspect, in a first possible implementation manner, the method further includes: obtaining an identifier of a second port according to the access loop identifier, where the second port is an egress port, on the multicast path, of the second port; sending a second forwarding entry to the second node, where a destination address of the second forwarding entry is the multicast MAC address and egress port information of the second forwarding entry is the identifier of the second port.

With reference to the first aspect, in a second possible implementation manner, the access loop identifier is an identifier of the first port.

With reference to the first aspect, in a third possible implementation manner, the obtaining an identifier of a first port according to the access loop identifier comprises:
    obtaining, according to the access loop identifier and a pre-stored mapping relationship between the access loop identifier and port information of each network node, the identifier of the first port; or
    obtaining, according to the access loop identifier and, a pre-stored mapping relationship between anthe access loop identifier and port information of each network node and a multicast path corresponding to the access loop identifier according to determined by a pre-stored network topology relationship, the identifier of the first port; or
    sending the access loop identifier to a server, where a network topology relationship and a mapping relationship between the access loop identifier and port information of each network node are pre-stored in the server; receiving the identifier of the first port fed back by the server.

With reference to first possible implementation manner, in a fourth possible implementation manner, the access loop identifier includes the identifier of the first port and the identifier of the second port, the obtaining an identifier of a second port according to the access loop identifier includes:
obtaining the identifier of the second port from the access loop identifier.

With reference to the second possible implementation manner in the first aspect, in a fifth possible implementation manner, the obtaining an identifier of a second port according to the access loop identifier includes:
    obtaining, according to the access loop identifier and a pre-stored mapping relationship between the access loop identifier and port information of each network node, the identifier of the second port; or obtaining, according to the access loop identifier and a pre-stored mapping relationship between the access loop identifier and port information of each network node and a multicast path corresponding to the access loop identifier determined by a pre-stored network topology relationship, the identifier of the second port; or sending the access loop identifier to a server, where a network topology relationship and a mapping relationship between the access loop identifier and port information of each network node are pre-stored in the server; receiving the identifier of the second port fed back by the server. With reference to the first aspect or any possible implementation manner of the first to the fifth possible implementation manners in the first aspect, in a sixth possible implementation manner, the obtaining, according to a multicast Internet Protocol (IP) address in the multicast control message, a multicast Media Access Control (MAC) address includes:

obtaining, according to the multicast IP address in the multicast control message and a stored mapping relationship between the multicast IP address and the multicast MAC address, the multicast MAC address.

With reference to the first aspect or any possible implementation manner of the first to the sixth possible implementation manners in the first aspect, in a seventh possible implementation manner, the multicast control message is an Internet Group Management Protocol IGMP packet or a Multicast Listener Discovery (MLD) protocol packet.

With reference to the first aspect or any possible implementation manner of the first to the seventh possible implementation manners in the first aspect, in an eighth possible implementation manner, the method further includes:

sending the IGMP packet or the MLD protocol packet to a node other than the first node; or generating a multicast routing protocol packet according to the IGMP packet or the MLD protocol packet and sending the multicast routing protocol packet to a node other than the first node.

With reference to the first aspect or any possible implementation manner of the first to the eighth possible implementation manners, in a ninth possible implementation manner, the receiving a packet sent by a first node includes:

receiving the packet sent by the first node according to an openflow protocol, or an access management or control protocol, or an Ethernet operation, administration and maintenance protocol, or a tunneling protocol.

According to a second aspect, a device for indicating a multicast forwarding entry is provided, including: a processor and a memory having processor-executable instructions stored thereon, the processor-executable instructions-which when executed on the processor cause the processor to:

receive a packet from a first node, wherein the packet includes a multicast control message and an access loop identifier;

obtain, according to a multicast Internet Protocol (IP) address in the multicast control message, a multicast Media Access Control (MAC) address;

obtain an identifier of a first port according to the access loop identifier, where the first port is an egress port, on the multicast path, of the first port;

send a first forwarding entry to the first node, where a destination address of the first forwarding entry is the multicast MAC address and egress port information of the first forwarding entry is the identifier of the first port.

With reference to the second aspect, in a first possible implementation manner, the instructions further cause the processor to obtain an identifier of a second port according to the access loop identifier, where the second port is an egress port, on the multicast path, of the second port; or send a second forwarding entry to the second node, where a destination address of the second forwarding entry is the multicast MAC address and egress port information of the second forwarding entry is the identifier of the second port.

With reference to the second aspect, in a second possible implementation manner, the access loop identifier is an access loop identifier of the first port.

With reference to the second aspect, in a third possible implementation manner, the instructions cause the processor to:

obtain, according to the access loop identifier and a pre-stored mapping relationship between the access loop identifier and port information of each network node, the identifier of the first port; or obtain, according to the access loop identifier, a pre-stored mapping relationship between the access loop identifier and port information of each network node and a multicast path corresponding to the access loop identifier determined by a pre-stored network topology relationship, the identifier of the first port; or.

send the access loop identifier to a server, where a network topology relationship and a mapping relationship between the access loop identifier and port information of each network node are pre-stored in the server; receive the identifier of the first port fed back by the server With reference to the first possible implementation manner in the second aspect, in a fourth possible implementation manner, the access loop identifier includes the identifier of the first port and the identifier of the second port, and the instructions cause the processor to obtain the identifier of the second port from the access loop identifier.

With reference to the second possible implementation manner in the second aspect, in a fifth possible implementation manner, the instructions cause the processor to:

obtain, according to the access loop identifier and a pre-stored mapping relationship between the access loop identifier and port information of each network node, the identifier of the second port; or obtain, according to the access loop identifier, a pre-stored mapping relationship between the access loop identifier and port information of each network node and a multicast path corresponding to the access loop identifier determined by a pre-stored network topology relationship, the identifier of the second port; or send the access loop identifier to a server, where a network topology relationship and a mapping relationship between the access loop identifier and port information of each network node are pre-stored in the server; receive the identifier of the second port fed back by the server.

With reference to the first second aspect or any possible implementation manner of the first to the fifth possible implementation manners in the second aspect, in a sixth possible implementation manner, the instructions cause the processor to obtain, according to the multicast IP address in the multicast control message and a stored mapping relationship between the multicast IP address and the multicast MAC address, the multicast MAC address.

With reference to the second aspect or any possible implementation manner of the first to the sixth possible implementation manners in the second aspect, in a seventh possible implementation manner, the multicast control message is an Internet Group Management Protocol (IGMP) packet or a Multicast Listener Discovery (MLD) protocol packet.

With reference to the second aspect or any possible implementation manner of the first to the seventh possible implementation manners in the second aspect, in an eighth possible implementation manner, the instructions further cause the processor to:

send the IGMP packet or the MLD protocol packet to a node other than the first node; or generate a multicast routing protocol packet according to the IGMP packet or the MLD protocol packet and send the multicast routing protocol packet to a node other than the first node.

With reference to the second aspect or any possible implementation manner of the first to the eighth possible implementation manners, in a ninth possible implementation manner, the instructions cause the processor to receive the packet sent by the first node according to an openflow protocol, or an access management or control protocol, or an Ethernet operation, administration and maintenance protocol, or a tunneling protocol.

In the embodiments of the present disclosure, a multicast control message and an access loop identifier sent by a first node are received; an identifier of a first port of a second node and an identifier of a second port of a third node on a multicast path corresponding to the access loop identifier are determined, where both the first port and the second port are egress ports on the multicast path; a multicast Media Access Control (MAC) address corresponding to the multicast path is determined according to a multicast Internet Protocol IP address in the multicast control message; a first forwarding entry is sent to the second node, where a destination address of the first forwarding entry is the multicast MAC address and egress port information of the first forwarding entry is the identifier of the first port. a second forwarding entry is sent to the third node, where a destination address of the second forwarding entry is the multicast MAC address and egress port information of the second forwarding entry is the identifier of the second port; and a separate device is used to generate a multicast forwarding entry for each network node on a multicast path, so as to enable each network node may acquire a multicast forwarding entry without parsing an IGMP packet or an MLD packet.

BRIEF DESCRIPTION OF DRAWINGS

To illustrate the technical solutions in the embodiments of the present disclosure more clearly, the following briefly introduces accompanying drawings required for describing the embodiments. Apparently, the accompanying drawings in the following description are some embodiments of the present disclosure, and a person of ordinary skill in the art may still derive other drawings according to these accompanying drawings without creative efforts.

DESCRIPTION OF EMBODIMENTS

To make the objectives, technical solutions, and advantages of embodiments of the present disclosure clearer, the following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure shall fall within the protection scope of the present disclosure.

The embodiments of the present disclosure provide a method for indicating a multicast forwarding entry and a device, so as to enable each network node to acquire a multicast forwarding entry without parsing an IGMP packet or an MLD packet.

Figure 1:
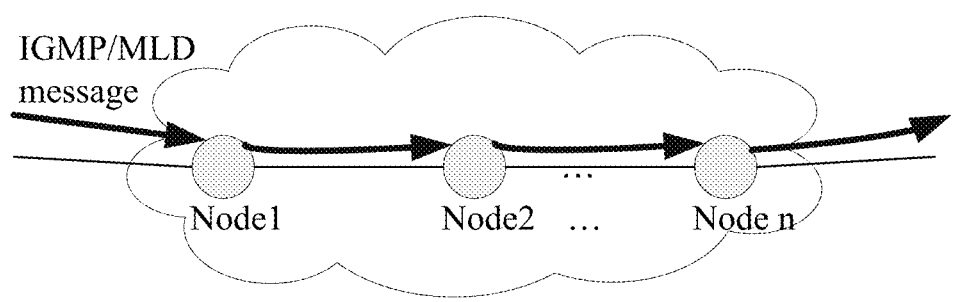
FIG. 1 is a schematic diagram of a typical scenario of an access network in the prior art.
Figure 2:
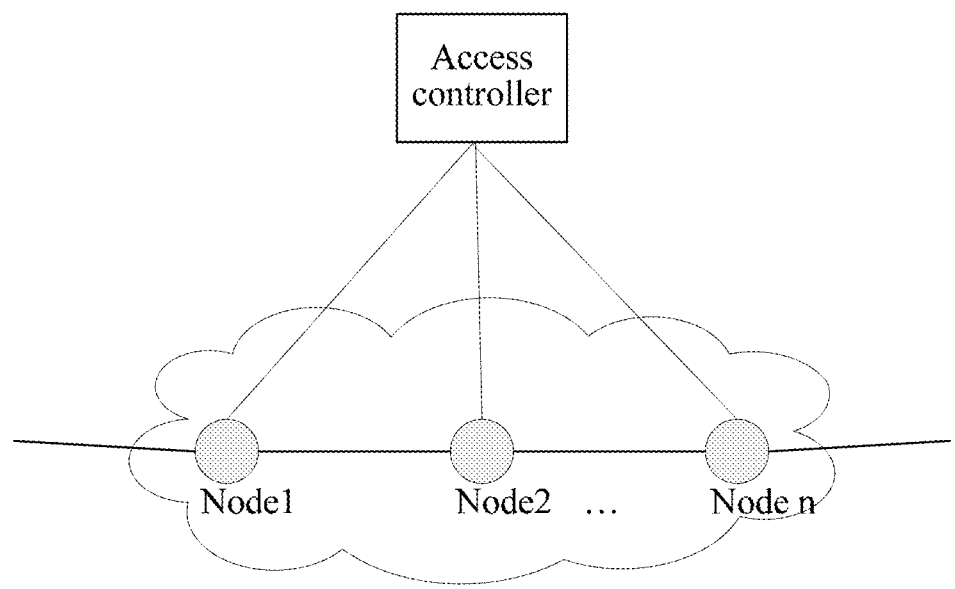
FIG. 2 is a schematic diagram of an access network scenario according to an embodiment of the present disclosure.

Referring to FIG. 2, FIG. 2 is a schematic diagram of a new access network scenario provided in an embodiment of the present disclosure. Control plane functions including listening/proxy of an IGMP/MLD of a network node are centralized on an access controller for implementation. Each network node is connected to the access controller through an Openflow protocol, an access management or control (for example, an optical network unit management and control interface (ONU Management and Control Interface, OMCI) or Ethernet operation, administration, and maintenance (Eth OAM)) protocol or a tunneling protocol. The access controller may be a stand-alone device, or may be embedded in a device such as an OLT, an aggregation node, or a router (for example, a BNG/BRAS) as a functional module.

Figure 3:
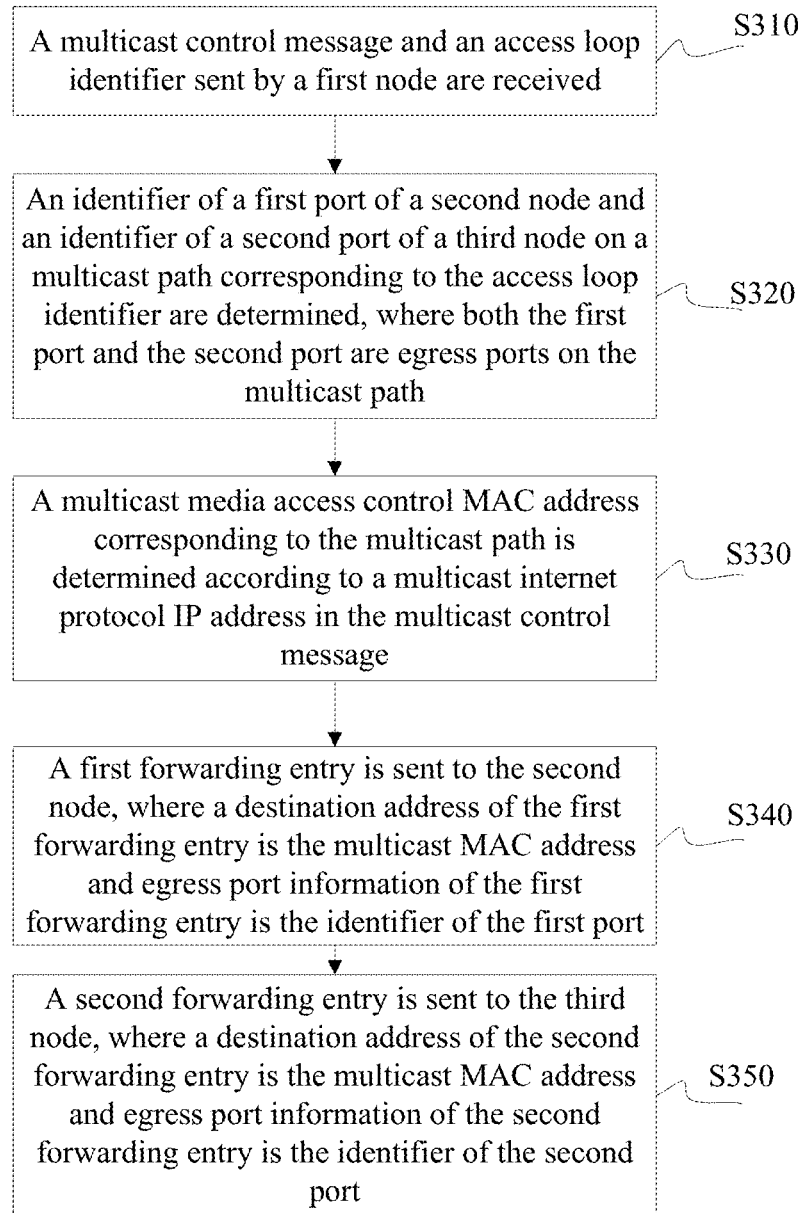
FIG. 3 is a schematic flowchart of a method for indicating a multicast forwarding entry according to an embodiment of the present disclosure.

Referring to FIG. 3, a method for indicating a multicast forwarding entry provided in an embodiment of the present disclosure includes:

S310. A multicast control message and an access loop identifier sent by a first node are received.

S320. An identifier of a first port of a second node and an identifier of a second port of a third node on a multicast path corresponding to the access loop identifier are determined, where both the first port and the second port are egress ports on the multicast path.

S330. According to a multicast Internet Protocol IP address in the multicast control message, a multicast Media Access Control (MAC) address corresponding to the multicast path is determined.

S340. A first forwarding entry is sent to the second node, where a destination address of the first forwarding entry is the multicast MAC address and egress port information of the first forwarding entry is the identifier of the first port.

S350. A second forwarding entry is sent to the third node, where a destination address of the second forwarding entry is the multicast MAC address and egress port information of the second forwarding entry is the identifier of the second port.

According to the embodiment of the present disclosure, a separate controller device is used to generate a multicast forwarding entry for a second node and a third node on a multicast path according to a message from a first node, so as to enable the second node and the third node to acquire a multicast forwarding entry of the current node without receiving and parsing an IGMP packet or an MLD packet from a previous hop node of the current node, avoiding a problem of failing to parse an IGMP or MLD message to establish multicast forwarding entry respectively by the second node and the third node when IGMP or MLD protocol versions of the first node, the second node and the third node are different.

Figure 4:
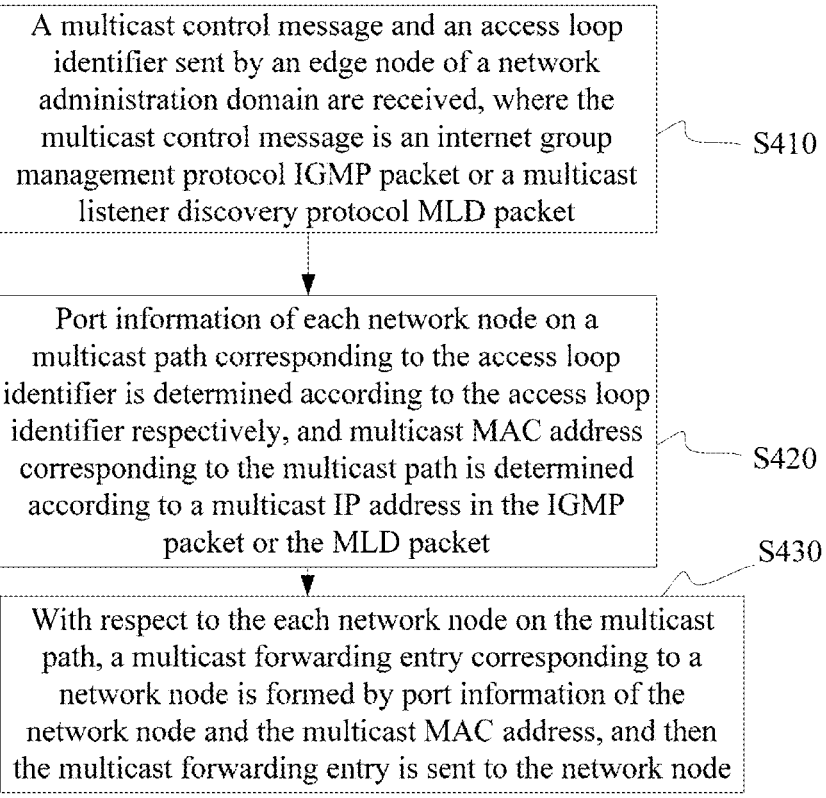
FIG. 4 is a schematic flowchart of a method for indicating a multicast forwarding entry according to another embodiment of the present disclosure.

Further, with reference to a flow shown in FIG. 3, with regards to a scenario in which multiple network nodes exist in a network and even a scenario in which a multicast path crosses a network administration domain of a controller device, an embodiment of the present disclosure provides a method for indicating a multicast forwarding entry, as shown in FIG. 4, including:

S410. A multicast control message and an access loop identifier sent by an edge node of a network administration domain are received, where the multicast control message is an internet group management protocol (IGMP) packet or a Multicast Listener Discovery protocol (MLD) packet.

S420. Port information of each network node on a multicast path corresponding to the access loop identifier is determined according to the access loop identifier, respectively, and a multicast media access control (MAC) address corresponding to the multicast path is determined according to a multicast internet protocol IP) address in the IGMP packet or the MLD packet.

S430. With respect to the each network node on the multicast path, a multicast forwarding entry corresponding to a network node is formed by port information of the network node and the multicast MAC address, and then the multicast forwarding entry is sent to the network node.

The edge node is an ingress network node or an egress network node in a current network administration domain. With respect to a multicast service, the edge node is generally an ingress network node or an egress network node on a multicast path within a network administration domain. The network node may be a device such as customer premises equipment (CPE), an AN (for example, an ONU/DSLAM/OLT), or an aggregation node, or a router (for example, a BNG/BRAS). The multicast control message includes an IGMP/MLD and an access loop identifier (Line ID).

Optionally, the access loop identifier is an access loop identifier of the edge node; in step S420, the port information of each network node on a multicast path corresponding to the access loop identifier is determined according to the access loop identifier respectively includes:

determining, according to the access loop identifier of the edge node, a pre-stored mapping relationship between the access loop identifier and the port information of each network node, and the multicast path corresponding to the access loop identifier of the edge node determined according to a pre-stored network topology relationship, the port information of each network node on the multicast path corresponding to the access loop identifier of the edge node; or sending the access loop identifier of the edge node to a server, where a mapping relationship between the access loop identifier and the port information of the each network node and a network topology relationship are pre-stored in the server; receiving the port information of the each network node on the multicast path corresponding to the access loop identifier of the edge node fed back by the server.

That is, a separate server may be set and an access controller may inquire the port information of the each network node on the multicast path corresponding to the access loop identifier from the server; or the access controller may preset the mapping relationship between the access loop identifier and the port of the each network node and the network topology relationship, and the access controller may inquire the mapping relationship and the network topology relationship to obtain the port information of the each network node.

The access loop identifier is an identifier that is widely used in various network systems, and with respect to a digital subscriber line (DSL) system or an Ethernet (ETH) access system, formats of the access loop identifier are as follows:

when an AN accesses a DSL line based on an asynchronous transfer mode (ATM), the access loop identifier is Access-Node-Identifier atm slot/port:vpi.vci. when the AN accesses a DSL/ETH line base on an ETH, a format of the access loop identifier is Access-Node-Identifier eth slot/port [:vlan-id]. Where the Access-Node-Identifier is an identifier of the AN; the slot/port is one or any combination of information such as a chassis number, a rack number, a frame number, a slot number, a sub-slot number, a port number on the AN, and specific content thereof is related to a layout condition of a device in a field; the vpi.vci is a virtual path identifier and a virtual channel identifier on a DSL line; "[ ]" in the format indicates it is optional.

With respect to a passive optical network (PON) system, the access loop identifier has two format options as follows:

Option 1 is that the access loop identifier only includes port information of an ONU and formats are as follows: when the ONU accesses a DSL line based on an ATM, a format is ONUID atm slot2/port2:vpi.vci. When the ONU accesses a DSL line based on an ETH, a format is ONUID eth slot2/port2[:vlan-id]. Normally, with respect to an ONU port, the vlan-id is a C-VLAN ID (Customer VLAN ID, customer virtual local area network identifier), which is used for identifying a user or an access line, and the vlan-id is generally added or removed by the ONU.

Option 2 is that the access loop identifier not only includes port information of an ONU, but also includes port information of an OLT, and formats are as follows: when the ONU accesses a DSL line based on an ATM, a format is Access-Node-Identifier atm slot1/port1/ONUID/slot2/port2: vpi.vci. When the ONU accesses a DSL/ETH line based on an ETH, a format is Access-Node-Identifier eth slot1/port1/ONUID/slot2/port2[:vlan-id]. Where the Access-Node-Identifier is an identifier of the OLT; the slot1/port1 is one or any combination of a chassis number, a rack number, a frame number, a slot number, a sub-slot number and a port number on the OLT, and specific content is related to field layout condition of a device; the slot2/port2 is one or the any combination of a chassis number, a rack number, a frame number, a slot number, a sub-slot number and a port number on the ONU.

In a word, an access loop identifier reported by a network node includes port information, and each node on a multicast path and port information thereof may be determined according to the access loop identifier reported by the network node.

Optionally, the access loop identifier is an access loop identifier of each access node on the multicast path; in step S420, the port information of each network node on a multicast path corresponding to the access loop identifier is determined according to the access loop identifier respectively includes:

acquiring, according to the access loop identifier of each access node on the multicast path, the port information included in the access loop identifier of each access node on the multicast path, respectively.

That is, in a scenario shown in FIG. 2, another embodiment is also provided, that is, an IGMP/MLD message is still transmitted on a multicast path, and each network node on the multicast path does not parse the IGMP/MLD message, but inserts an access loop identifier of the current node in the message before forwarding the IGMP/MLD message, and then an edge node of a network administration domain reports the IGMP/MLD message and an access loop identifier of each node to an access controller. Finally, the access controller parse the IGMP/MLD message, acquires port information in the access loop identifier and indicates to each network node a multicast forwarding entry corresponds to the each network node.

Specifically, in the step S420, that a multicast Media Access Control (MAC) address corresponding to the multicast path is determined according to a multicast Internet Protocol IP address in the multicast control message includes:

determining, according to the multicast IP address in the multicast control message and a predetermined mapping relationship between the multicast IP address and the multicast MAC address, the multicast MAC address corresponding to the multicast path.

Specifically, after the step S410, the method further includes: sending the IGMP packet or the MLD packet to another edge node except the edge node; or generating a multicast routing protocol packet according to the IGMP packet or the MLD packet and sending the multicast routing protocol packet to another edge node except the edge node.

When the another edge node (for example, Node n in FIG. 2) is an access node (for example, an OLT, a DSLAM) or an aggregation node, the access controller forwards the IGMP/MLD message to the another edge node through an Openflow protocol, an access management or control protocol (for example, an OMCI or an ETH OAM) or a tunnel protocol. When the another edge node is a router (for example, a BNG/BRAS), the access controller forwards a generated multicast routing protocol (for example, a protocol independent multicast (PIM)/source-specific multicast (SSM)) message to the another edge node serving as the router through the Openflow protocol, the access management or control protocol or the tunneling protocol. After receiving the IGMP packet or the MLD packet or the multicast routing protocol packet, the another edge node continues to transmit the packet.

Figure 5:
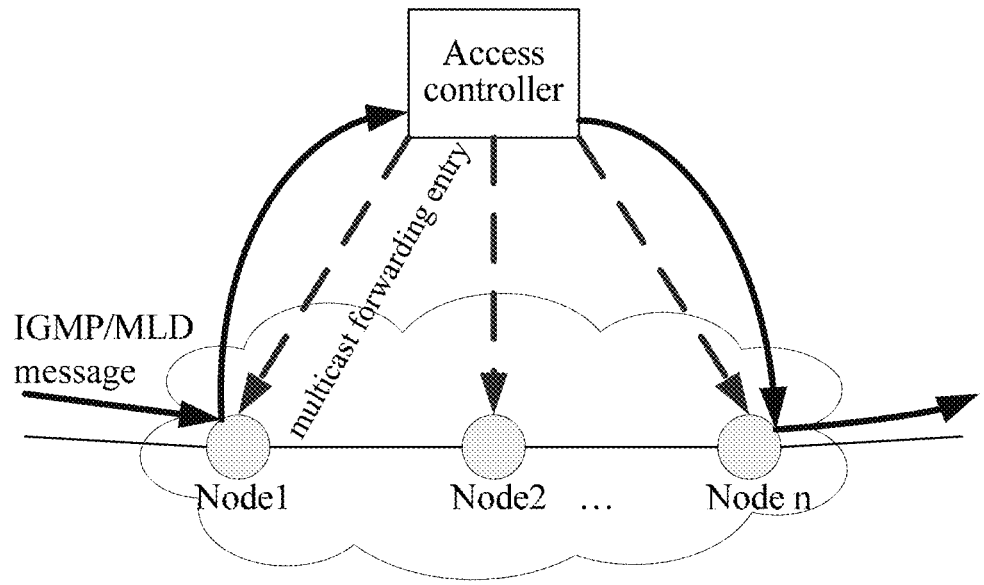
FIG. 5 is a diagram of message flow according to an embodiment of the present disclosure.

A diagram of message flow in the foregoing embodiment is shown in FIG. 5, where an access controller receives an IGMP/MLD message sent by an edge serving as an ingress network node, sends a multicast forwarding entry to each network node, and sends the IGMP/MLD message to an edge node serving as an egress network node.

Several specific embodiments of the present disclosure will be given below.

Figure 6:
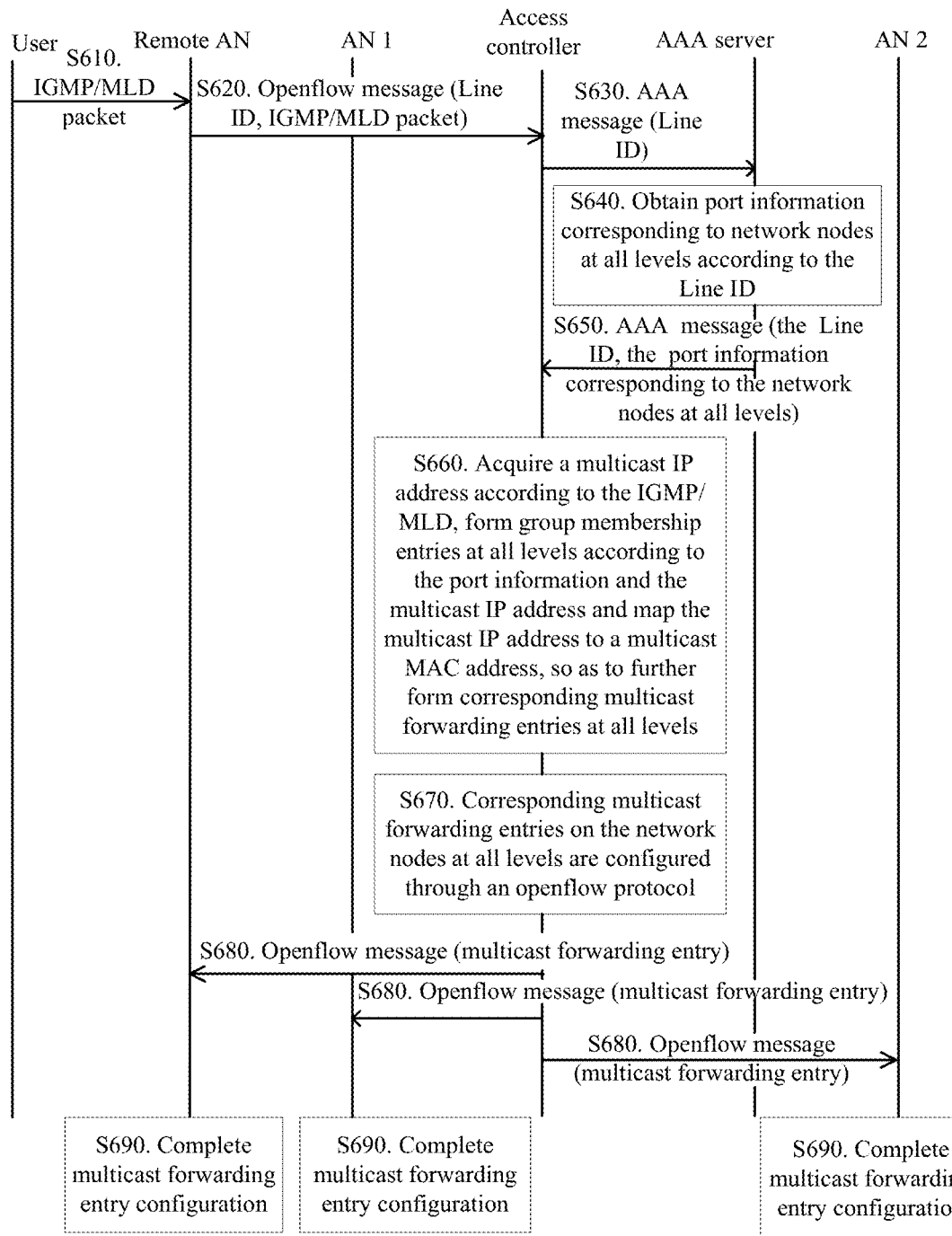
FIG. 6 is a schematic flowchart of specific embodiment 1 of the present disclosure.

Referring to FIG. 6, specific embodiment 1 of the present disclosure includes steps as follows:

S610. A user sends an IGMP/MLD packet to a remote access node (Remote AN).

S620. The Remote AN sends the IGMP/MLD packet and a Line ID to an access controller by extending an openflow message.

S630. The access controller sends an AAA message to an AAA (an abbreviation of Authentication, Authorization and Accounting) server, where the Line ID is carried in the AAA message, and the AAA message is used for inquiring port information.

S640. The AAA server obtains port information corresponding to network nodes at all levels according to the Line ID.

S650. The AAA server sends an AAA message to the access controller, where the Line ID and the port information corresponding to the network nodes at all levels are carried in the AAA message.

S660. The access controller acquires a multicast IP address according to the IGMP/MLD packet, forms group membership entries at all levels according to the port information and the multicast IP address and maps the multicast IP address to a multicast MAC address, so as to further form corresponding multicast forwarding entries at all levels.

S670. Corresponding multicast forwarding entries on the network nodes at all levels are configured through an openflow protocol.

S680. A corresponding multicast forwarding entry is sent to each network node through an openflow message.

S690. The each network node implements multicast forwarding entry configuration.

In the specific embodiment 1, when the Remote AN is an ONU, an AN 1 is an OLT and an AN 2 is a DSLAM, the Line ID carried in the openflow message in the step S620 may be Option 1, and in this case, the access controller inquires the AAA server to obtain port information of the OLT and the DSLAM according to Line ID information; or the Line ID carried in the openflow message in the step S620 is Option 2, the ONU needs to obtain or set port information of the OLT in advance, and in this case, the access controller inquires the AAA server to obtain port information of the DSLAM according to Line ID information.

Figure 7:
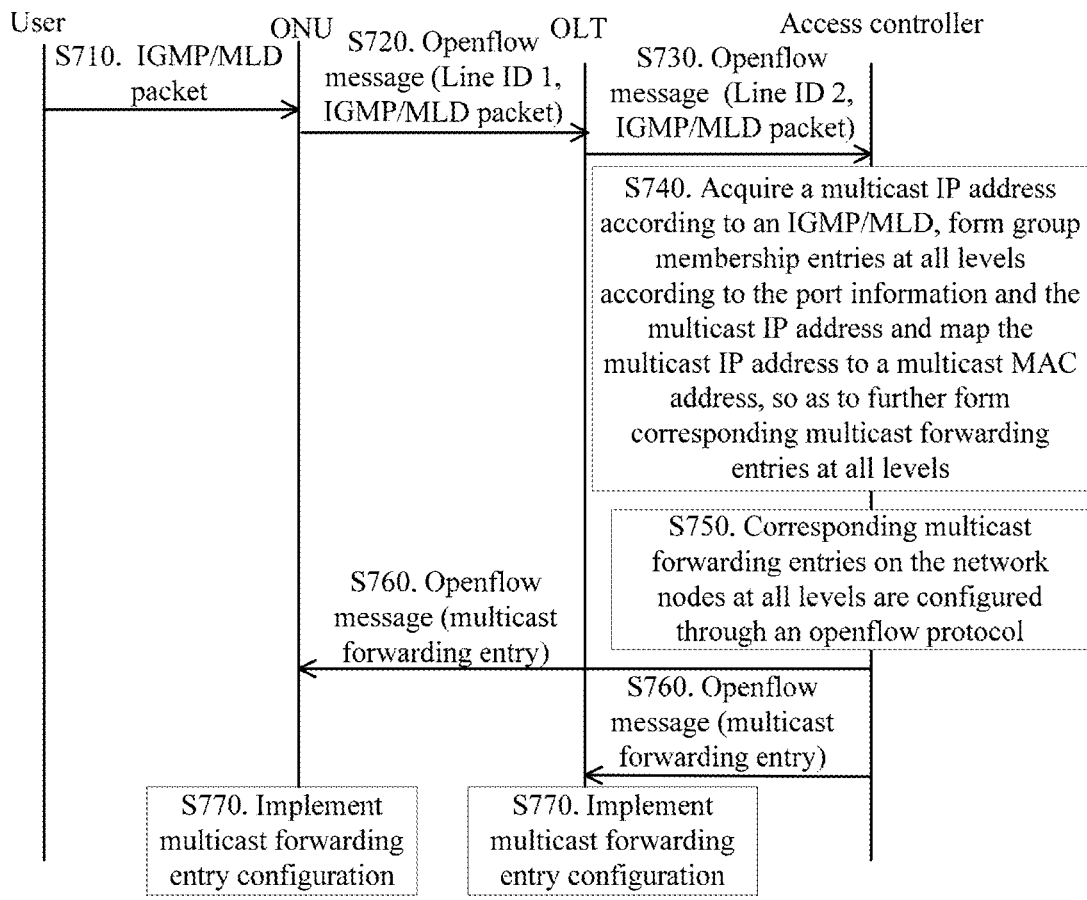
FIG. 7 is a schematic flowchart of specific embodiment 2 of the present disclosure.

Referring to FIG. 7, specific embodiment 2 of the present disclosure includes steps as follows:

S710. A user sends an IGMP/MLD packet to an ONU.

S720. The ONU sends the IGMP/MLD packet and a Line ID 1 (port information of the ONU) to an OLT by extending an openflow message.

S730. The OLT sends the IGMP/MLD packet and a Line ID 2 (port information of the ONU and port information of the OLT) to an access controller by extending an openflow message.

S740. The access controller acquires a multicast IP address according to an IGMP/MLD packet, forms group membership entries at all levels according to the port information and the multicast IP address and maps the multicast IP address to a multicast MAC address, so as to further form corresponding multicast forwarding entries at all levels.

S750. Corresponding multicast forwarding entries on the network nodes at all levels are configured through an openflow protocol.

S760. A corresponding multicast forwarding entry is sent to each network node through an openflow message.

S770. The each network node implements multicast forwarding entry configuration.

Figure 8:
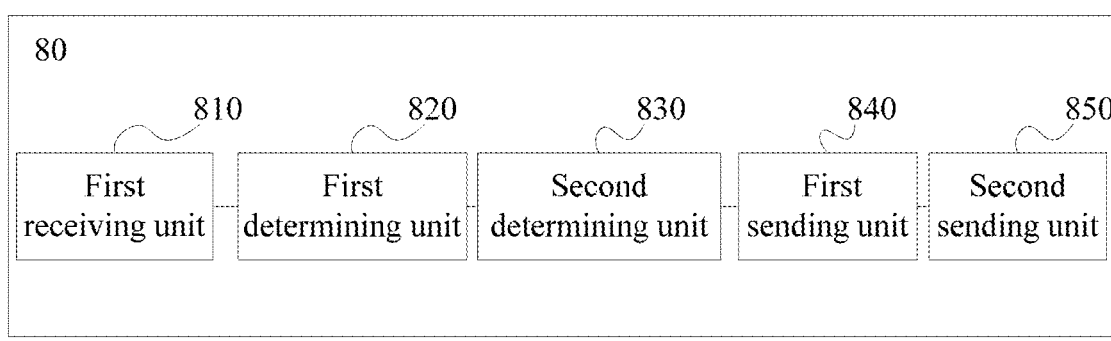
FIG. 8 is a schematic structural diagram of a device according to an embodiment of the present disclosure.

Referring to FIG. 8, a device 80 for indicating a multicast forwarding entry is provided in an embodiment of the present disclosure, including:

a first receiving unit 810, configured to receive a multicast control message and an access loop identifier sent by a first node;

a first determining unit 820, configured to determine an identifier of a first port of a second node and an identifier of a second port of a third node on a multicast path corresponding to the access loop identifier, where both the first port and the second port are egress ports on the multicast path;

a second determining unit 830, configured to determine, according to a multicast Internet Protocol IP address in the multicast control message, a multicast Media Access Control (MAC) address corresponding to the multicast path;

a first sending unit 840, configured to send a first forwarding entry to the second node, where a destination address of the first forwarding entry is the multicast MAC address and egress port information of the first forwarding entry is the identifier of the first port; and a second sending unit 850, configured to send a second forwarding entry to the third node, where a destination address of the second forwarding entry is the multicast MAC address and egress port information of the second forwarding entry is the identifier of the second port.

Optionally, the access loop identifier received by the first receiving unit 810 is an access loop identifier of the first node.

The first determining unit 820 is specifically configured to:

determine, according to the access loop identifier of the first node and a pre-stored mapping relationship between an access loop identifier and port information of each network node and a multicast path corresponding to the access loop identifier of the first node determined according to a pre-stored network topology relationship, the identifier of the first port of the second node and the identifier of the second port of the third node on the multicast path corresponding to the access loop identifier of the first node; or send the access loop identifier of the first node to a server, where a mapping relationship between the access loop identifier and the port information of each network node and a network topology relationship are pre-stored in the server; receive the identifier of the first port of the second node and the identifier of the second port of the third node on the multicast path corresponding to the access loop identifier of the first node fed back by the server.

Optionally, the access loop identifier received by the first receiving unit 810 includes an access loop identifier of the first node, an access loop identifier of the second node and an access loop identifier of the third node, and both the second node and the third node are on a multicast path corresponding to the access loop identifier of the first node.

The first determining unit 820 is specifically configured to:

acquire, according to the access loop identifier of the second node and the access loop identifier of the third node on the multicast path, the identifier of the first port of the second node and the identifier of the second port of the third node on the multicast path, respectively.

Optionally, the second determining unit 830 is specifically configured to:

determine, according to the multicast IP address in the multicast control message and a predetermined mapping relationship between the multicast IP address and the multicast MAC address, the multicast MAC address corresponding to the multicast path.

Optionally, the multicast control message received by the first receiving unit 810 is an internet group management protocol (IGMP) packet or a Multicast Listener Discovery protocol (MLD) packet.

Further, the device 80 also includes:

a third sending unit, configured to send the IGMP packet or the MLD packet to a fourth node; or generate a multicast routing protocol packet according to the IGMP packet or the MLD packet and send the multicast routing protocol packet to a fourth node.

Further, the first receiving unit 810 is specifically configured to:

receive the multicast control message and the access loop identifier sent by the first node according to an openflow protocol, or an access management or control protocol, or an Ethernet operation, administration and maintenance protocol, or a tunneling protocol.

Figure 9:
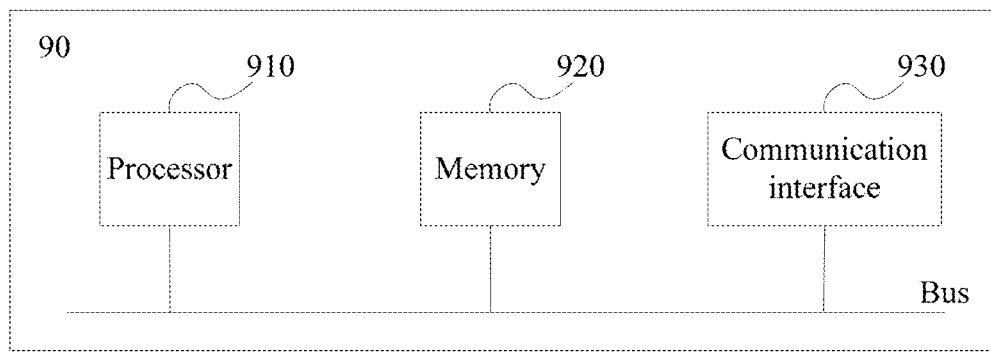
FIG. 9 is another schematic structural diagram of a device according to an embodiment of the present disclosure.

Referring to FIG. 9, a device 90 for indicating a multicast forwarding entry is provided in an embodiment of the present disclosure, including:

a processor 910, a memory 920 and a communication interface 930, where the processor 910, the memory 920 and the communication interface 930 are connected to each other through a bus or in another manner.

The memory 920 is configured to store a program. Specifically, the program may include a program code, and the program code includes a computer operating instruction. The memory may include a high-speed random access memory (RAM for short), and may further include a non-volatile memory, for example at least one magnetic disk memory.

The communication interface 930 is configured to communicate with each node.

When executing the program stored in the memory 920, the processor 910 may execute S310-S350 in the embodiment corresponding to FIG. 3, S410-S430 in the embodiment corresponding to FIG. 4 and all operations of the access controller in the embodiments corresponding to FIG. 5 to FIG. 7, and may display all functions of the device 80 of the multicast forwarding entry.

The forgoing processor may be a general-purpose processor, including a central processing unit (CPU for short), a network processor (NP for short) or the like; it may also be a digital signal processor (DSP), an application-specific integrated circuit (ASIC), a field-programmable gate array (FPGA) or other programmable logic devices, a discrete gate or a transistor logic device or a discrete hardware component.

In a word, according to the embodiments of the present disclosure, control plane functions of a network node are centralized at an access controller side, and the network node is simplified as a programmable forwarding device. In this way the network node does not have to support listening/proxy of an IGMP/MLD, achieving decoupling the network node from a multicast service. The network node does not need to consider compatibility and matching with a terminal and a multicast router, thereby greatly reducing operation and maintenance complexity and management cost.

Those skilled in the art should understand that the embodiments of the present disclosure may be provided as a method, a system or a computer program product. Therefore, the present disclosure may adopt the forms of complete hardware embodiments, complete software embodiments or combined embodiments of software and hardware. Moreover, the present disclosure may adopt the form of a computer program product implemented on one or multiple computer available storage media (including, but not limited to, a disk storage, an optical memory) including computer available program codes.

The present disclosure is described in accordance with the flowchart and/or block diagram of the method, the device (system) and the computer program product in the embodiments of the present disclosure. It should be understood that, computer program instructions may achieve each flow and/or block in the flowchart and/or the block diagram and the combination of the flows and/or blocks in the flowchart and/or the block diagram. These computer program instructions may be provided to a general-purpose computer, a special-purpose computer, an embedded processor or processors of other programmable data processing devices to generate a machine, such that the instructions executed by the computers or the processors of the other programmable data processing devices generate apparatuses used for achieving appointed functions in one flow or multiple flows of the flowchart and/or one block or multiple blocks of the block diagram.

These computer program instructions may also be stored in a computer readable memory capable of guiding the computers or the other programmable data processing devices to work in particular manners, such that the instructions stored in the computer readable memory generate products including instruction apparatuses, and the instruction apparatuses achieve the appointed functions in one flow or multiple flows of the flowchart and/or one block or multiple blocks of the block diagram.

These computer program instructions may also be loaded onto the computers or the other programmable data processing devices, to execute a series of operation steps on the computers or the other programmable data processing devices to produce processing implemented by the computers, such that the instructions executed on the computers or the other programmable data processing devices provide steps used for achieving the appointed functions in one flow or multiple flows of the flowchart and/or one block or multiple blocks of the block diagram.

Obviously, persons skilled in the art may make various modifications and variations to the present disclosure without departing from the spirit and scope of the present disclosure. In this way, if these modifications and variations of the present disclosure belong to the scope of the claims of the present disclosure and the equivalent technologies thereof, then the present disclosure is intended to encompass these modifications and variations.

What is claimed is:

1. A method for indicating a multicast forwarding entry, the method comprising:
    receiving, by an access controller, a packet from a first node, wherein the packet comprises a multicast control message and an access loop identifier;
    obtaining, by the access controller, according to a multicast Internet Protocol (IP) address in the multicast control message, a multicast Media Access Control (MAC) address, wherein the multicast MAC address is used to identify multicast group;
    obtaining, by the access controller, an identifier of a first port and an identifier of a second port according to the access loop identifier, wherein the first port is an egress port, on a multicast path, of the first node, and the second port is an egress port, on the multicast path, of a second node;
    generating, by the access controller, a first forwarding entry and a second forwarding entry, wherein a destination address of the first forwarding entry is the multicast MAC address, egress port information of the first forwarding entry is the identifier of the first port, a destination address of the second forwarding entry is the multicast MAC address, and egress port information of the second forwarding entry is the identifier of the second port;
    sending, by the access controller, the first forwarding entry to the first node, wherein the first forwarding entry is used by the first node to identify and transmit a multicast data packet; and
    sending, by the access controller, the second forwarding entry to the second node, wherein the second forwarding entry is used by the second node to identify and transmit a multicast data packet.

2. The method according to claim 1, wherein the access loop identifier is an identifier of the first port.

3. The method according to claim 1, wherein
    the obtaining an identifier of a first port according to the access loop identifier comprises:
    obtaining, according to the access loop identifier and a pre-stored mapping relationship between the access loop identifier and port information of each network node, the identifier of the first port; or
    obtaining, according to the access loop identifier, a pre-stored mapping relationship between the access loop identifier and port information of each network node and a multicast path corresponding to the access loop identifier determined by a pre-stored network topology relationship, the identifier of the first port; or
    sending the access loop identifier to a server, wherein a network topology relationship and a mapping relationship between the access loop identifier and port information of each network node are pre-stored in the server; and receiving the identifier of the first port fed back by the server.

4. The method according to claim 1, wherein the access loop identifier comprises the identifier of the first port and the identifier of the second port, the obtaining an identifier of a second port according to the access loop identifier comprises: obtaining the identifier of the second port from the access loop identifier.

5. The method according to claim 1, wherein the obtaining an identifier of a second port according to the access loop identifier comprises:
    obtaining, according to the access loop identifier and a pre-stored mapping relationship between the access loop identifier and port information of each network node, the identifier of the second port; or
    obtaining, according to the access loop identifier, a pre-stored mapping relationship between the access loop identifier and port information of each network node and a multicast path corresponding to the access loop identifier determined by a pre-stored network topology relationship, the identifier of the second port; or
    sending the access loop identifier to a server, wherein a network topology relationship and a mapping relationship between the access loop identifier and port information of each network node are pre-stored in the server; and receiving the identifier of the second port fed back by the server.

6. The method according to claim 1, wherein the obtaining, according to a multicast Internet Protocol (IP) address in the multicast control message, a multicast Media Access Control (MAC) address comprises:
obtaining, according to the multicast IP address in the multicast control message and a stored mapping relationship between the multicast IP address and the multicast MAC address, the multicast MAC address.

7. The method according to claim 1, wherein the multicast control message is an Internet Group Management Protocol (IGMP) packet or a Multicast Listener Discovery (MLD) protocol packet.

8. The method according to claim 7, further comprising:
sending the IGMP packet or the MLD protocol packet to a node other than the first node; or
generating a multicast routing protocol packet according to the IGMP packet or the MLD protocol packet and sending the multicast routing protocol packet to a node other than the first node.

9. The method according to claim 1, wherein the receiving a packet sent by a first node comprises:
receiving the packet sent by the first node according to an openflow protocol, or an access management or control protocol, or an Ethernet operation, administration and maintenance protocol, or a tunneling protocol.

10. A device for indicating a multicast forwarding entry, the device comprising a processor and a memory having processor-executable instructions stored thereon, the processor-executable instructions when executed on the processor cause the processor to:
receive a packet from a first node, wherein the packet comprises a multicast control message and an access loop identifier;
obtain, according to a multicast Internet Protocol (IP) address in the multicast control message, a multicast Media Access Control (MAC) address, wherein the multicast MAC address is used to identify multicast group;
obtain an identifier of a first port and an identifier of a second port according to the access loop identifier, wherein the first port is an egress port, on a multicast path, of the first node, and the second port is an egress port, on the multicast path, of a second node;
generating a first forwarding entry and a second forwarding entry, wherein a destination address of the first forwarding entry is the multicast MAC address, egress port information of the first forwarding entry is the identifier of the first port, a destination address of the second forwarding entry is the multicast MAC address, and egress port information of the second forwarding entry is the identifier of the second port;
send the first forwarding entry to the first node, wherein the first forwarding entry is used by the first node to identify and transmit a multicast data packet; and
send the second forwarding entry to the second node, wherein the second forwarding entry is used by the second node to identify and transmit a multicast data packet.

11. The device according to claim 10, wherein the access loop identifier is an access loop identifier of the first port.

12. The device according to claim 10, wherein the instructions cause the processor to:

obtain, according to the access loop identifier and a pre-stored mapping relationship between the access loop identifier and port information of each network node, the identifier of the first port; or
obtain, according to the access loop identifier, a pre-stored mapping relationship between the access loop identifier and port information of each network node and a multicast path corresponding to the access loop identifier determined by a pre-stored network topology relationship, the identifier of the first port; or
send the access loop identifier to a server, wherein a network topology relationship and a mapping relationship between the access loop identifier and port information of each network node are pre-stored in the server; and receive the identifier of the first port fed back by the server.

13. The device according to claim 10, wherein the access loop identifier comprises the identifier of the first port and the identifier of the second port, and the instructions cause the processor to obtain the identifier of the second port from the access loop identifier.

14. The device according to claim 10, wherein the instructions cause the processor to: obtain, according to the access loop identifier and a pre-stored mapping relationship between the access loop identifier and port information of each network node, the identifier of the second port; or
obtain, according to the access loop identifier, a pre-stored mapping relationship between the access loop identifier and port information of each network node and a multicast path corresponding to the access loop identifier determined by a pre-stored network topology relationship, the identifier of the second port; or
send the access loop identifier to a server, wherein a network topology relationship and a mapping relationship between the access loop identifier and port information of each network node are pre-stored in the server; and receive the identifier of the second port fed back by the server.

15. The device according to claim 10, wherein the instructions cause the processor to
obtain, according to the multicast IP address in the multicast control message and a stored mapping relationship between the multicast IP address and the multicast MAC address, the multicast MAC address.

16. The device according to claim 10, wherein the multicast control message is an Internet Group Management Protocol IGMP packet or a Multicast Listener Discovery (MLD) protocol packet.

17. The device according to claim 16, wherein the instructions further cause the processor to:
send the IGMP packet or the MLD protocol packet to a node other than the first node; or
generate a multicast routing protocol packet according to the IGMP packet or the MLD protocol packet and send the multicast routing protocol packet to a node other than the first node.

18. The device according to claim 10, wherein the instructions cause the processor to:
receive the packet sent by the first node according to an openflow protocol, or an access management or control protocol, or an Ethernet operation, administration and maintenance protocol, or a tunneling protocol.

\* \* \* \* \*

UNITED STATES PATENT AND TRADEMARK OFFICE
CERTIFICATE OF CORRECTION

PATENT NO. : 11,196,576 B2
APPLICATION NO. : 15/332867
DATED : December 7, 2021
INVENTOR(S) : Zheng Page 1 of 1

It is certified that error appears in the above-identified patent and that said Letters Patent is hereby corrected as shown below:

On the Title Page

Page 2, Item (56) U.S. Patent Documents, Citation 6: "2012/0236864 A1 9/2012 Zheng" should read -- 2012/0236864 A1 9/2012 Zheng et al. --.

In the Claims

Claim 1: Column 13, Line 67: "used to identify multicast group;" should read -- used to identify a multicast group; --.

Claim 10: Column 15, Line 40: "multicast MAC address is used to identify multicast" should read -- multicast MAC address is used to identify a multicast --.

Signed and Sealed this
Seventeenth Day of May, 2022

Katherine Kelly Vidal
*Director of the United States Patent and Trademark Office*